US012748736B2

(12) United States Patent
Agrawal et al.

(10) Patent No.: US 12,748,736 B2
(45) Date of Patent: Sep. 29, 2026

(54) AUTOMATED DATA OBSERVABILITY SYSTEM

(71) Applicant: Revefi, Inc., Sammamish, WA (US)

(72) Inventors: Sanjay Agrawal, Sammamish, WA (US); Shashank Gupta, Sammamish, WA (US); Pramod Kalipatnapu, Sammamich, WA (US)

(73) Assignee: Revefi, Inc., Sammamish, WA (US)

( * ) Notice: Subject to any disclaimer, the term of this patent is extended or adjusted under 35 U.S.C. 154(b) by 0 days.

(21) Appl. No.: 18/754,854

(22) Filed: Jun. 26, 2024

(65) Prior Publication Data

US 2024/0427747 A1 Dec. 26, 2024

Related U.S. Application Data

(60) Provisional application No. 63/510,340, filed on Jun. 26, 2023.

(51) Int. Cl.

| | |
|---|---|
| ***G06F 16/215*** | (2019.01) |
| ***G06F 11/07*** | (2006.01) |
| ***G06F 16/26*** | (2019.01) |

(52) U.S. Cl.

CPC .......... *G06F 16/215* (2019.01); *G06F 11/079* (2013.01); *G06F 16/26* (2019.01)

(58) Field of Classification Search

None

See application file for complete search history.

(56) References Cited

U.S. PATENT DOCUMENTS

| | | | | |
|---|---|---|---|---|
| 11,451,842 | B2 * | 9/2022 | Gershey | G06N 20/00 |
| 11,537,627 | B1 * | 12/2022 | Baskaran | G06F 16/951 |
| 2020/0104401 | A1 | 4/2020 | Burnett et al. | |

OTHER PUBLICATIONS

Marwa Elsayed; PredictDeep: Security Analytics as a Service for Anomaly Detection and Prediction; IEEE; 2020 pp. 45184-45197.*

Md Salik Parwez; Big Data Analytics for User-Activity Analysis and User-Anomaly Detection in Mobile Wireless Network; IEEE; (Year: 2017).*

Using Machine Learning to Detect Traffic Anomalies by Jim Goodrich; Dated 2019; Accessed Apr. 24, 2026; 34 pages; https://conf.splunk.com/files/2019/slides/FN1390.pdf.

(Continued)

*Primary Examiner* — Ann J Lo

*Assistant Examiner* — Jermaine A Mincey

(74) *Attorney, Agent, or Firm* — Young Basile Hanlon & MacFarlane, P.C.

(57) ABSTRACT

An automated data observation system, platform, and corresponding methods and non-transitory computer readable medium include periodically obtaining metadata, automatically generating data quality metrics, obtaining predicted values for the data quality metrics, determining a first anomaly, generating a data pipeline graph, and estimating a root cause relating to the first anomaly by traversing the data pipeline graph. Obtaining predicted values for the data quality metrics includes executing a plurality of candidate machine learning models over time series data relating to the data quality metrics to generate candidate predicted values and selecting a machine learning model for a given data quality metric based on the candidate predicted values and measured values.

15 Claims, 9 Drawing Sheets

(56) References Cited

OTHER PUBLICATIONS

Deep dive: Using ML to identify network traffic anomalies; Dated 2024; Accessed Apr. 24, 2026; 5 pages; https://docs.splunk.com/Documentation/MLApp/5.4.1/User/IDnetworktrafficanoms.
Anomaly Detection Using Program Control Flow Graph Mining from Execution Logs by Animesh Nandi et al.; Dated 2016; Accessed Apr. 24, 2026; 10 pages: https://netman.aiops.org/~peidan/ANM2019/7.TraceAnomalyDetection/LectureCoverage/2016KDD_Anomaly Detection Using Program Control Flow Graph Mining from Execution LogsAnomaly Detection Using Program Control Flow Graph Mining from Execution Logs.pdf.
A Survey of Graph-based Deep Learning for Anomaly Detection in Distributed Systems by A. Danesh Pazho et al: Dated Jun. 1, 2023; Accessed Apr. 24, 2026; 20 pages; https://arxiv.org/pdf/2206.04149.
Data-Driven Construction of Data Center Graph of Thingsfor Anomaly Detection by Hao Zhang et al.; Dated Apr. 27, 2020; Accessed Apr. 24, 2026; 17 pages; https://arxiv.org/pdf/2004.12540.
ANEMONE: Graph Anomaly Detection with Multi-Scale Contrastive Learning by Ming Jin et al.; Dated Nov. 1-5, 2021; Accessed Apr. 24, 2026; 5 pages; https://shiruipan.github.io/publication/cikm-21-jin/cikm-21-jin.pdf.
Graph Contrastive Learning for Anomaly Detection by Bo Chen et al; Dated Aug. 29, 2022; Accessed Apr. 24, 2026; 14 pages; https://arxiv.org/pdf/2108.07516.

* cited by examiner

AUTOMATED DATA OBSERVABILITY SYSTEM

CROSS-REFERENCE TO RELATED APPLICATION(S)

This application claims the benefit of U.S. Provisional Application No. 63/510,340, filed Jun. 26, 2023, the entire disclosure of which is herein incorporated by reference.

BACKGROUND

Modern enterprises rely on various tools to obtain, store, and utilize data. These tools may be used in such a way that rely on inputs from other tool(s) and provide output(s) to other tools thus forming a data pipeline. Errors that occur with these tools or the data processed by these tools can negatively impact the availability and reliability of a data pipeline.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
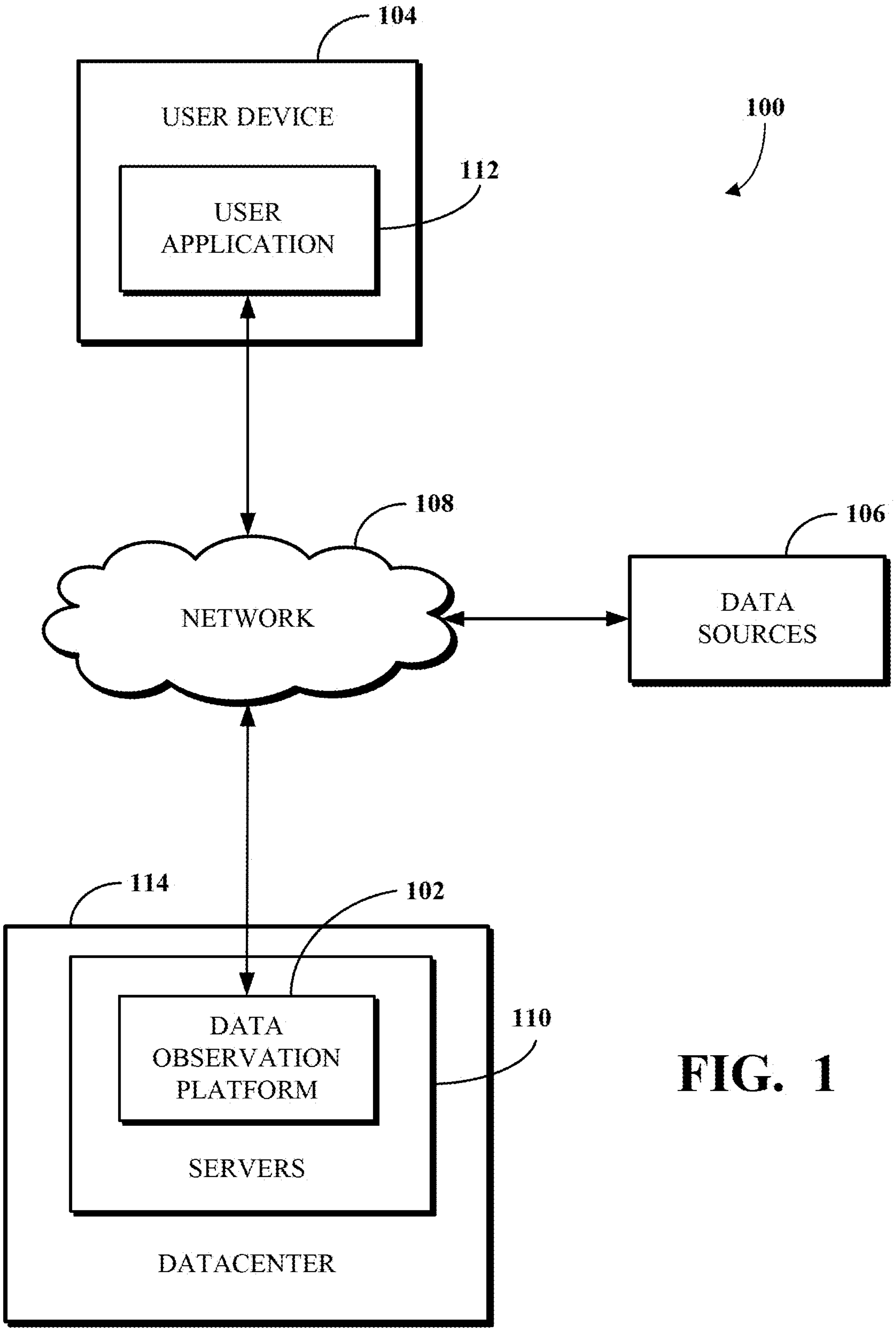
FIG. 1 is a block diagram of an example of a computing system which includes a data observation platform.

Aspects of this disclosure relate to a data observation platform and system that monitors a data pipeline for errors. For example, a data pipeline may have nodes through which data is passed in the data pipeline. A node may be, for example, a data source (e.g., Salesforce), a ETL (exchange transfer load) tool (e.g., Airbyte), a data warehouse (e.g., Snowflake), and an analytics tool (e.g., Tableau). The data observation platform and system may operate on structured data (e.g., databases, and data warehouses). Implementations of the platform and system may detect and notify users regarding anomalous patterns on data along data quality metrics such as: data quality, data loading and usage costs, query and load performance.

Data in a database or data warehouse is stored as tables where each table has a schema. Data is loaded into tables using DML statements (these are data manipulation statements viz. inserts, updates or deletes on the table). Queries are executed against one or more tables using a structured language (e.g., structured query language (SQL)).

Metadata relating to nodes may be periodically collected by the platform. Data quality metrics may be automatically generated for some or all nodes accessible by the platform. For example, in some implementations, each of the tables in a data warehouse may have data quality metrics generated. The data quality metrics that are generated may be based on the available metadata. For example, measured values for some data quality metrics may be obtainable from the metadata and measured values for other data quality metrics may not be obtainable from the metadata.

Data quality metrics may include:

Data landing timestamps—Timestamps (date and time) table was modified,

Incremental rows—Number of rows inserted into the table during DML statements in a certain time period (e.g., hour, day, week), Incremental Bytes Processed—Number of bytes inserted into the table during DML statements in a certain time period (e.g., hour, day, week), Number of load commands—Number of times DML statements were issued against the table in a certain time period (e.g., hour, day, week).

Load duration—Total duration for all the DML statements that were issued against the table in a certain time period (e.g., hour, day, week).

Total Row Count—Number of Rows in the table at a given timestamp.

Implementations of this disclosure may utilize an unsupervised learning approach to automatically choose the corresponding machine learning techniques to best model the underlying table metrics. For example, a plurality of candidate machine learning models may be executed against time series data associated with a data quality metrics and one of the machine learning models may be selected based on that model having a smaller error between its predicted values and measured values in the time series data. The selected technique (e.g., model) is then used to predict the next set of values that the system expects for the corresponding metric. In addition to predicted value, it may include confidence intervals around the predicted value that are referred to as high, and low thresholds. If the measured value of the metric falls outside the band, it is marked as an anomaly, and the user may be notified of the anomaly.

For metrics for table landing times, implementations of this disclosure include monitoring the underlying data to check if it has landed in the expected band as above. For example, this may be done by determining a time difference (e.g., in minutes or seconds) between data landing timestamps or between the last data landing timestamp and a current time. Once the timestamp threshold is exceeded and data has not yet landed, an anomaly is detected.

A data pipeline graph may be generated corresponding to at least some of the nodes based on logs relating to the use of the nodes. For example, with respect to a data warehouse, a query log may be used to identify where data inserted in a table is selected from to determine a relationship (e.g., represented by directional edge) between those nodes (tables).

A root cause may then be estimated by traversing the data pipeline graph from a node for which an anomaly is detected. For example, the data pipeline graph can be traversed in a direction opposite that of the flow of data between nodes until such time that a node is found without a corresponding anomaly (e.g., the last node traversed having an anomaly can be estimated as being the root cause).

Conventional systems may have technical problems in that they are not capable of observing data at scale. In other words, conventional systems may utilize computational, memory, network, and other resources in excess of the availability or reasonable usage of such resources. Conventional systems may also require manual design and setup which may lead to errors and/or the lack of use of data observation given the complexity of such manual operations.

Implementations of this disclosure provide a technical solution to at least some of the foregoing technical problems by providing more resource efficient ways of observing data at scale. For example, by utilizing metadata relating to tables instead of (and/or in addition to) data stored in tables, less compute, memory, and network resources are utilized to obtain the monitored data and less compute, memory, and network resources may be utilized to execute machine learning models on metadata relating to tables as compared to data stored in tables. By utilizing metadata, metrics can be automatically generated and machine learning models automatically executed to predict values for those metrics while utilizing an aggregate level of resources far less than what would be required if metrics were automatically generated based on table data instead of metadata. For example, for some data sources (e.g., with respect to a data warehouse), data metrics may be automatically generated for all of the tables in the data warehouse given the reduced utilization of resources resulting from the use of metadata. The ability to automatically generate metrics for all of the tables in a data warehouse provides coverage over the entire warehouse thus enabling root cause analysis over the entire warehouse (whereas in conventional systems, there may be only partial coverage thus reducing the ability to perform a root cause analysis).

To describe some implementations in greater detail, reference is first made to examples of hardware and software structures used to implement a system for query generation using derived data relationships. FIG. 1 is a block diagram of an example of a computing system 100 which includes a data observation platform 102. A user of the data observation platform 102, such as a user of a user device 104, can configure the data observation platform 102 to obtain data from one or more data sources 106 over a network 108.

The user device 104 is a computing device capable of accessing the data observation platform 102 over the network 108, which may be or include, for example, the Internet, a local area network (LAN), a wide area network (WAN), a virtual private network (VPN), or another public or private means of electronic computer communication. For example, the user device 104 may be a mobile phone, a tablet computer, a laptop computer, a notebook computer, a desktop computer, or another suitable computing device. In some cases, the user device 104 may be registered to or otherwise associated with a customer of the data observation platform 102. The data observation platform 102 may be created and/or operated by a service provider and may have one or more customers, which may each be a public entity, private entity, or another corporate entity or individual that purchases or otherwise uses software services of the data observation platform 102. Without limitation, the data observation platform 102 can support hundreds or thousands of customers, and each of the customers may be associated with or otherwise have registered to it one or more user devices, such as the user device 104.

The data sources 106 are computing devices which temporarily or permanently store data processable by the data observation platform 102. As shown, the data sources 106 are external to the data observation platform 102 and the computing aspects which implement it (i.e., the servers 110, as introduced below). The data sources 106 in at least some cases are thus computing devices operated other than by a customer of the data observation platform 102. For example, a data source external to the data observation platform 102 may be or refer to a computing device wholly or partially operated by a third party or by the service provider. Examples of such external data sources include, without limitation, instances of Snowflake®, Amazon S3@, Salesforce®, and Tableau®. In some implementations, however, a data source 106 may be or refer to a computing device operated by a customer of the data observation platform 102. For example, the data source 106 may be a computing device which stores internally generated or maintained transaction, user, or other operational data of the customer. In such a case, the data source 106 In some implementations, external data sources 106 may communicate with the data observation platform over a first network 108 (e.g., a WAN) and internal data sources 106 may communicate with the data observation platform 102 over a second network 108 (e.g., a LAN).

The data observation platform 102 is implemented using one or more servers 110, including one or more application servers and database servers. The servers 110 can each be a computing device or system, which can include one or more computing devices, such as a desktop computer, a server computer, or another computer capable of operating as a server, or a combination thereof. In some implementations, one or more of the servers 110 can be a software implemented server implemented on a physical device, such as a hardware server. In some implementations, a combination of two or more of servers 110 can be implemented as a single hardware server or as a single software server implemented on a single hardware server. For example, an application server and a database server can be implemented as a single hardware server or as a single software server implemented on a single hardware server. In some implementations, the servers 110 can include servers other than application servers and database servers, for example, media servers, proxy servers, and/or web servers.

The data observation platform 102 may be implemented in a web application configuration, a server application in a client-server configuration, or another configuration. The user device 104 accesses the data observation platform 102 using a user application 112. The user application 112 may be a web browser, a client application, or another type of software application.

In one example, where the data observation platform 102 is implemented as a web application, the user application 112 may be a web browser, such that the user device 104 may access the web application using the web browser running at the user device 104. For example, the user device 104 may access a home page for the data observation platform 102 from which a software service thereof may be connected to, or the user device 104 may instead access a page corresponding to a software service thereof directly within the web browser at the user device 104. The user of the user device 104 may thus interact with the software service and data thereof via the web browser.

In another example, where the data observation platform 102 is implemented in a client-server configuration, the user application 112 may be a client application, such that the user device 104 may run the client application for delivering functionality of at least some of the software of the data observation platform 102 at the user device 104, which may thus be referred to as a client device. The client application accesses a server application running at the servers 110. The server application delivers information and functionality of at least some of the software of the data observation platform 102 to the user device 104 via the client application.

In some implementations, the data observation platform 102 may be on-premises software run at a site operated by a private or public entity or individual associated with the user device 104. For example, the data sources 106 may be sources available at that site and then network 108 may be a LAN which connects the data sources 106 with the servers 110. The data observation platform 102 may in some such cases be used to analyze and monitor data limited to that site operator.

In some implementations, a customer instance, which may also be referred to as an instance of the data observation platform, can be implemented using one or more application nodes and one or more database nodes. For example, the one or more application nodes can implement a version of the software of the data observation platform, and databases implemented by the one or more database nodes can store data used by the version of the software of the data observation platform. The customer instance associated with one customer may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node, such as wherein the database node includes separate catalogs or other structure for separating the data used by platform software of a first customer and platform software of a second customer.

The computing system 100 can allocate resources of a computer network using a multi-tenant or single-tenant architecture. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary JVM; or a single database server catalog, such as a unitary MySQL catalog, can handle requests from multiple customers. In some implementations of a multi-tenant architecture, an application server, a database server, or both can distinguish between and segregate data or other information of the various customers of the data observation platform 102.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as random access memory (RAM), storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

The servers 110 are located at a datacenter 114. The datacenter 114 can represent a geographic location, which can include a facility, where the one or more servers are located. Although a single datacenter 114 including one or more servers 110 is shown, the computing system 100 can include a number of datacenters and servers or can include a configuration of datacenters and servers different from that generally illustrated in FIG. 1. For example, and without limitation, the computing system 100 can include tens of datacenters, and at least some of the datacenters can include hundreds or another suitable number of servers. In some implementations, the datacenter 114 can be associated or communicate with one or more datacenter networks or domains. In some implementations, such as where the data observation platform 102 is on-premises software, the datacenter 114 may be omitted.

The network 108, the datacenter 114, or another element, or combination of elements, of the system 100 can include network hardware such as routers, switches, other network devices, or combinations thereof. For example, the datacenter 114 can include a load balancer for routing traffic from the network 108 to various ones of the servers 110. The load balancer can route, or direct, computing communications traffic, such as signals or messages, to respective ones of the servers 110. For example, the load balancer can operate as a proxy, or reverse proxy, for a service, such as a service provided to user devices such as the user device 104 by the servers 110. Routing functions of the load balancer can be configured directly or via a domain name service (DNS). The load balancer can coordinate requests from user devices and can simplify access to the data observation platform 102 by masking the internal configuration of the datacenter 114 from the user devices. In some implementations, the load balancer can operate as a firewall, allowing or preventing communications based on configuration settings. In some implementations, the load balancer can be located outside of the datacenter 114, for example, when providing global routing for multiple datacenters. In some implementations, load balancers can be included both within and outside of the datacenter 114.

Figure 2:
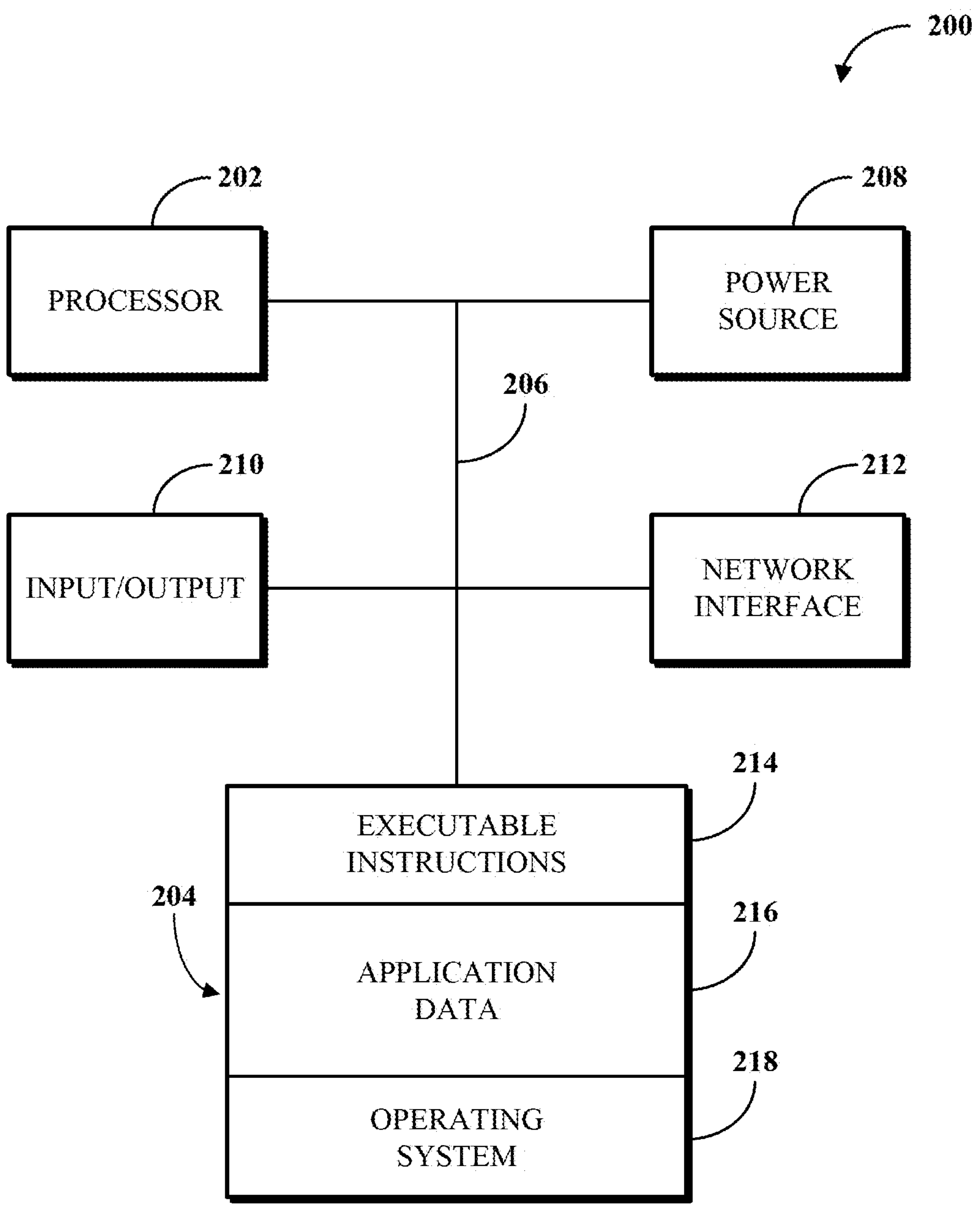
FIG. 2 is a block diagram of an example internal configuration of a computing device usable with a computing system.

FIG. 2 is a block diagram of an example internal configuration of a computing device 200 usable with a computing system, such as the computing system 100 shown in FIG. 1. The computing device 200 may, for example, implement one or more of the user device 104 or one of the servers 110 of the computing system 100 shown in FIG. 1.

The computing device 200 includes components or units, such as a processor 202, a memory 204, a bus 206, a power source 208, input/output devices 210, a network interface 212, other suitable components, or a combination thereof. One or more of the memory 204, the power source 208, the input/output devices 210, or the network interface 212 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. Generally speaking, with currently existing memory technology, volatile hardware provides for lower latency retrieval of data and is more scarce (e.g., due to higher cost and lower storage density) and non-volatile hardware provides for higher latency retrieval of data and has greater availability (e.g., due to lower cost and high storage density). The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 214, application data 216, and an operating system 218. The executable instructions 214 can include one or more application programs, which can be loaded or copied, in whole or in part, from non-volatile memory to volatile memory to be executed by the processor 202. For example, the executable instructions 214 can include instructions for performing some or all of the techniques of this disclosure. The application data 216 can include user data, database data (e.g., database catalogs or dictionaries), or the like. In some implementations, the application data 216 can include functional programs, such as a web browser, a web server, a database server, another program, or a combination thereof. The operating system 218 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The input/output devices 210 include one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 212 provides a connection or link to a network (e.g., the network 108 shown in FIG. 1). The network interface 212 can be a wired network interface or a wireless network interface. The computing device 200 can communicate with other devices via the network interface 212 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
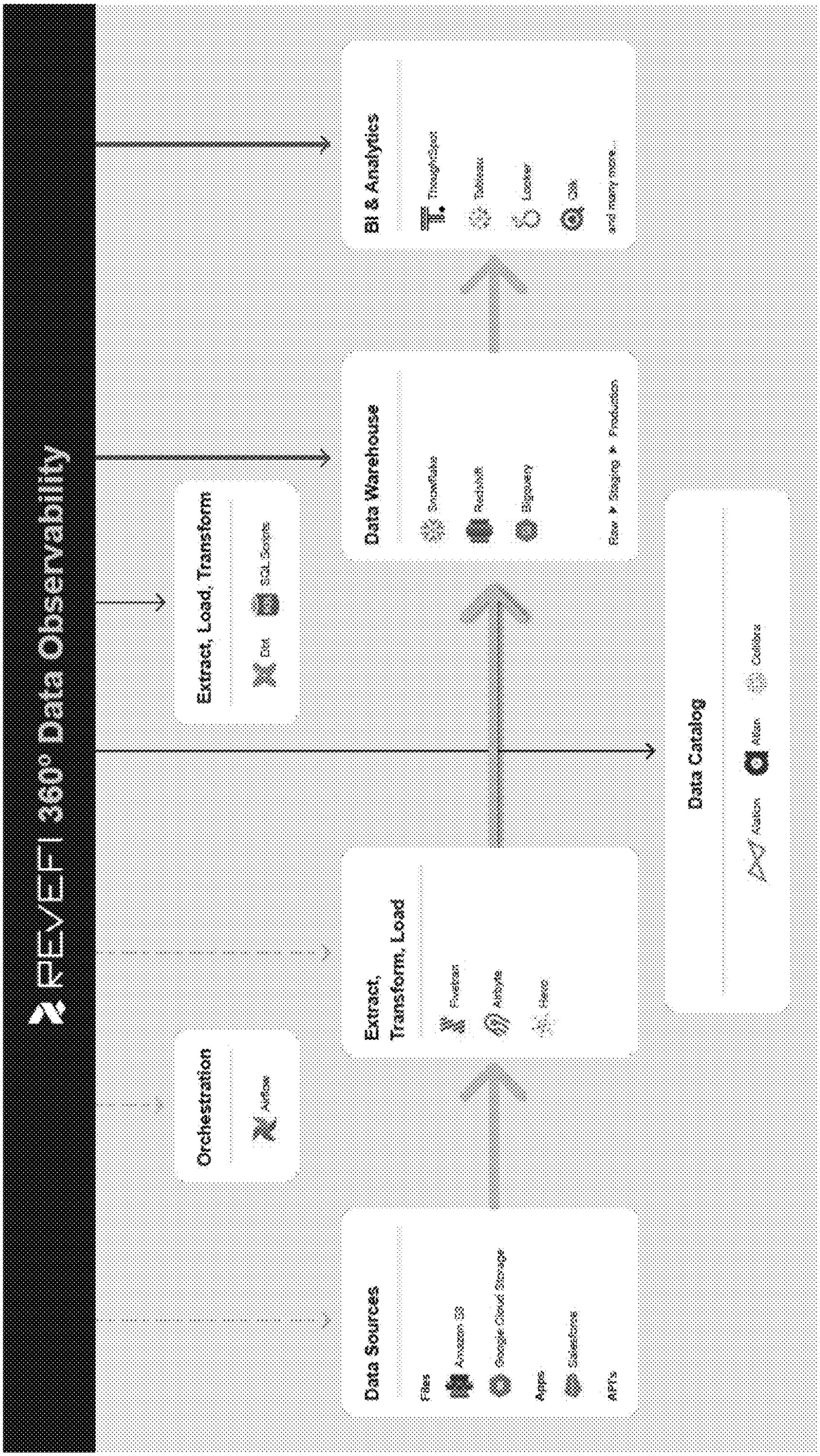
FIG. 3 is a block diagram of tools that can be utilized in a data pipeline.

FIG. 3 is a block diagram of tools that can be utilized in a data pipeline. For example, a data pipeline can include one or more tables from tools from the categories of data sources, ETL, data warehouse, and Analytics. In a pipeline, a given node may be associated with a table or other data structure in a tool and may receive inputs from a node earlier in the pipeline and may provide outputs to a node later in a pipeline. Other categories of tools that may be nodes in a data pipeline include orchestration tools, data catalog tools, and extract, load, transform tools (ELT).

Figure 4:
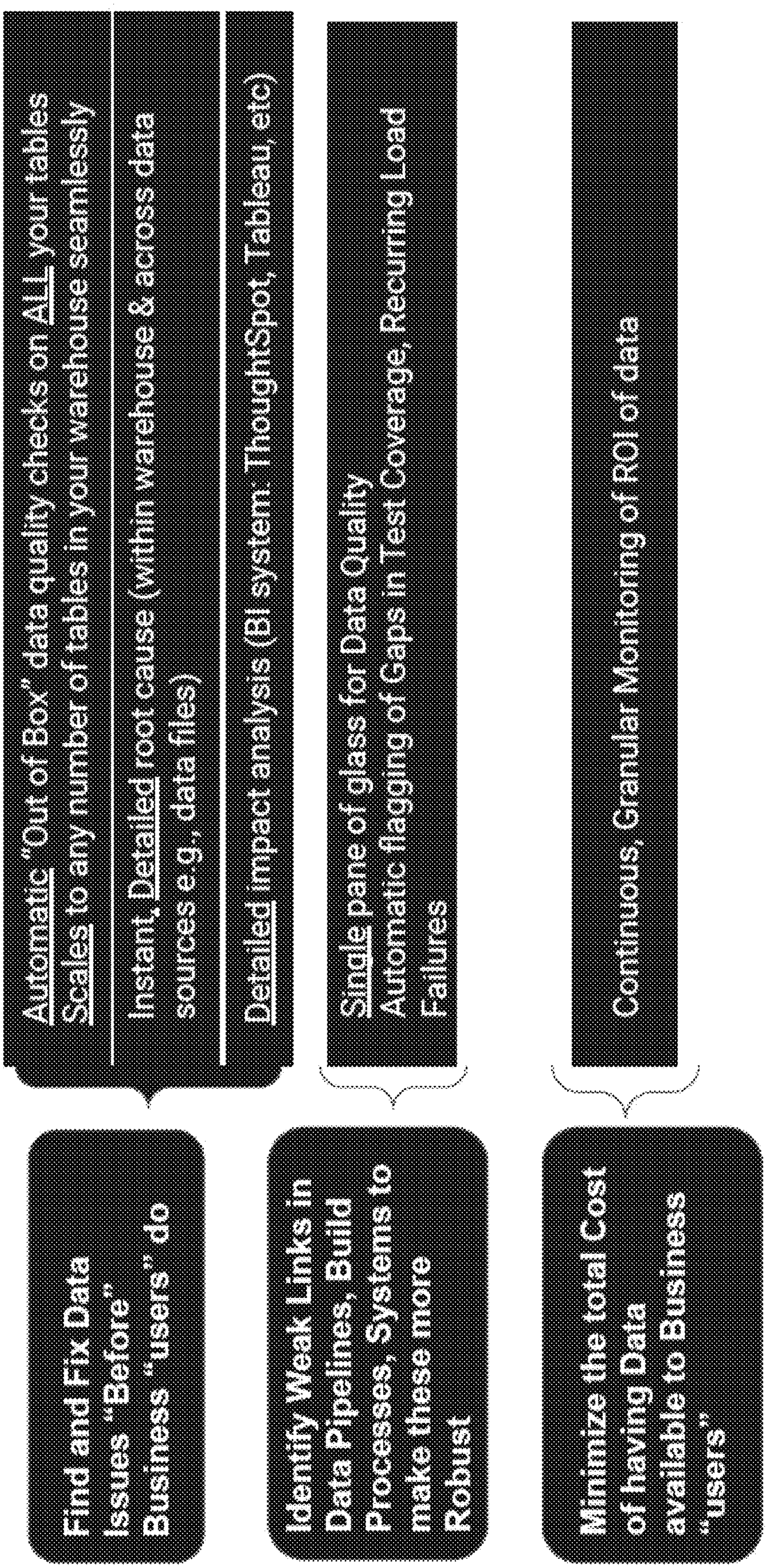
FIG. 4 is a block diagram of use cases for an automated data observation system.

FIG. 4 is a block diagram of use cases for an automated data observation system. An automated data observation system may be utilized to proactively find and fix data issues, identify weak links in data pipelines to enable making those data pipelines more robust, and reducing the resource utilization and cost of data pipelines based on data pipeline, tool and/or node utilization.

FIGS. 5A-5D depict example user interfaces that may be utilized in implementations or a data observation platform. Such user interfaces may, for example, be displayed on a user device (e.g., user device 104) using an application executing on the user device, such as a web browser. The data observation platform (e.g., data observation platform 102) may generate or transmit instructions and data to the user device that enables the user device to generate the user interface for display on a display connected to the user device.

Figure 5A:
FIG. 5A is a screenshot of a user interface showing statuses of nodes observed by a data observation platform.

FIG. 5A is a screenshot of a user interface showing statuses of nodes observed by a data observation platform. The user interface shows a listing of tables for a particular tool. Measured values are obtained for data quality metrics the tables daily (or indications that a measured value is unavailable or the absence of a measured value). If all the quality metrics fall within the bounds predicted by the respective model for each quality metric for a table for a given day, then the status for that table and day is green. If any of the quality metrics fall outside of the predicted bound for a given table and day, then the status for that table and day is red. In some implementations, some or certain combinations of data quality metrics that fall outside of the predicted bound may not change the display (e.g., for data quality metrics that are less reliable indicators of an anomaly).

Figure 5B:
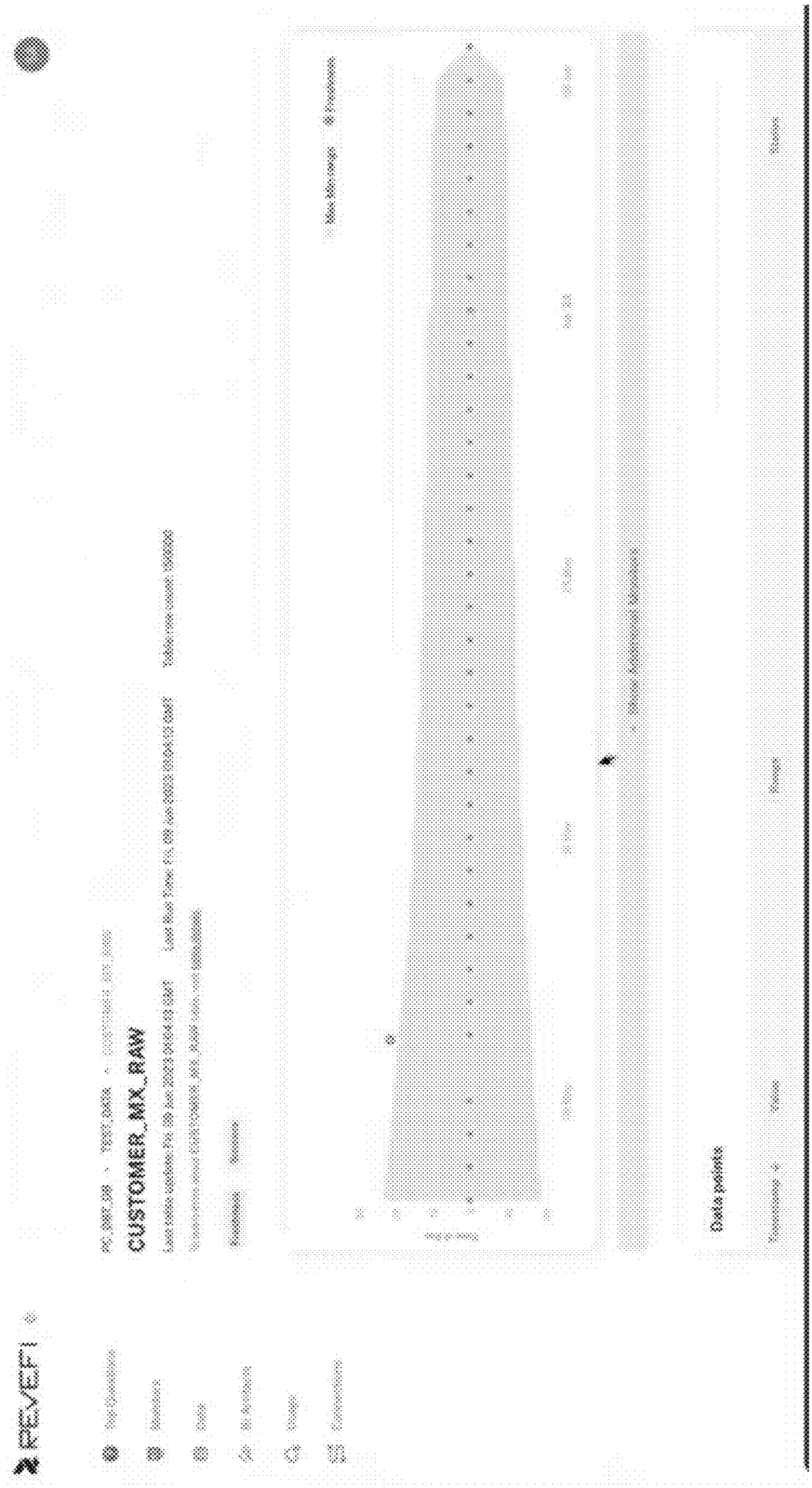
FIG. 5B is a screenshot of a user interface showing a prediction of a metric.

FIG. 5B is a screenshot of a user interface showing a prediction of a metric. The user interface shows a freshness metric. On the y access the time of day at which a data table is updated is shown, and on the x axis, the date is shown. The shaded area shows the predicted bounds for an acceptable value for the metric (e.g., which may be represented by way of a predicted value and a confidence interval produced by a model). The dots indicate measured values for the metric. As is shown the as the number of days increased, the confidence of the model increases and the bounds for the acceptable value narrows (e.g., becomes more sensitive).

Figure 5C:
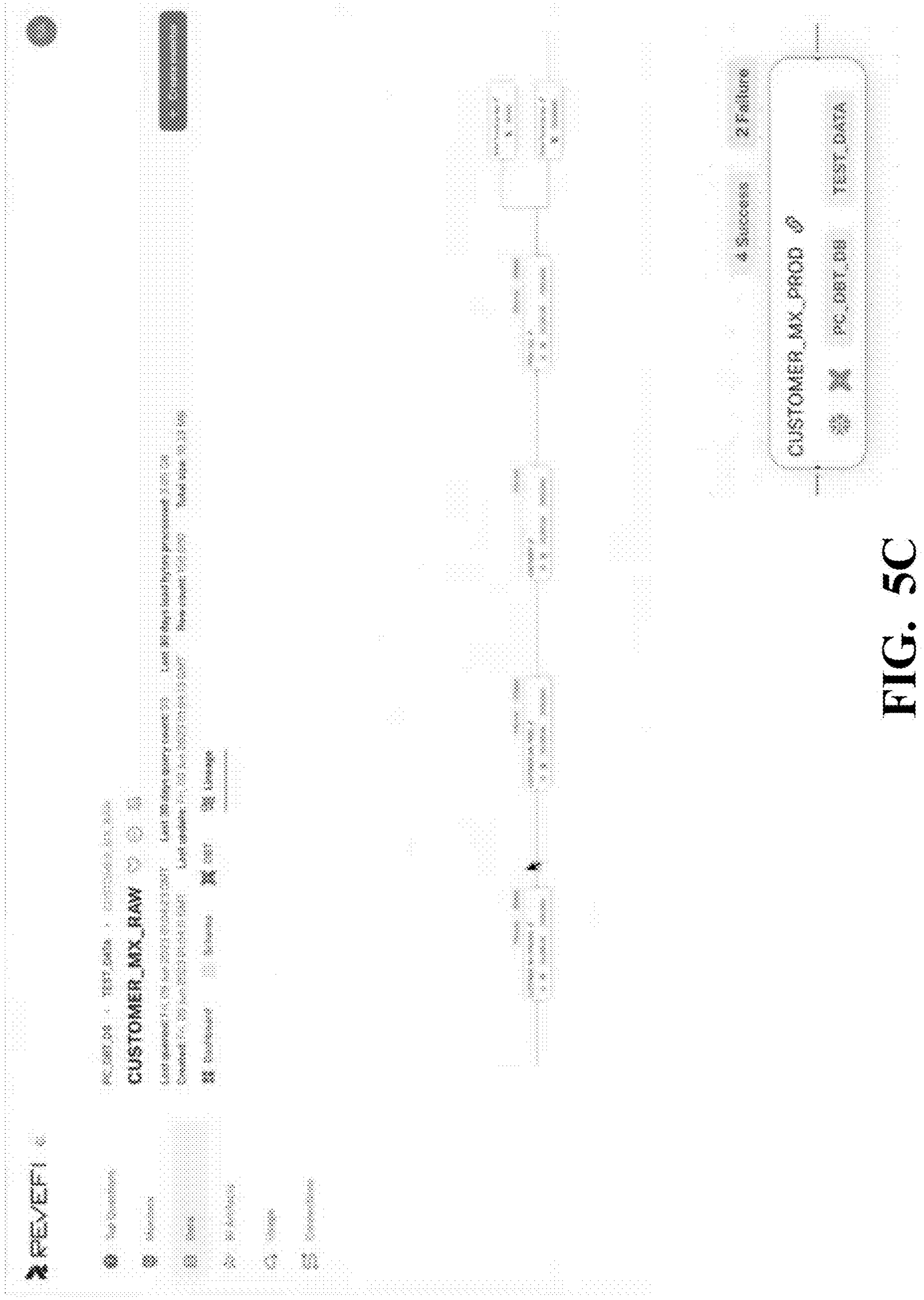
FIG. 5C is a screenshot of a user interface showing a data pipeline.

FIG. 5C is a screenshot of a user interface showing a data pipeline. A data pipeline includes a series of nodes. Data pipelines are identified by the data observation platform by analyzing queries performed by the tools observed by the platform. Such queries may indicate the placement of nodes in a data pipeline based on the relative inputs and output s of queries performed using the tools. The user interface may show an indication of metrics associated with nodes in the data pipeline which may indicate where in a pipeline an anomaly is occurring which may impact the functioning of the data pipeline.

Figure 5D:
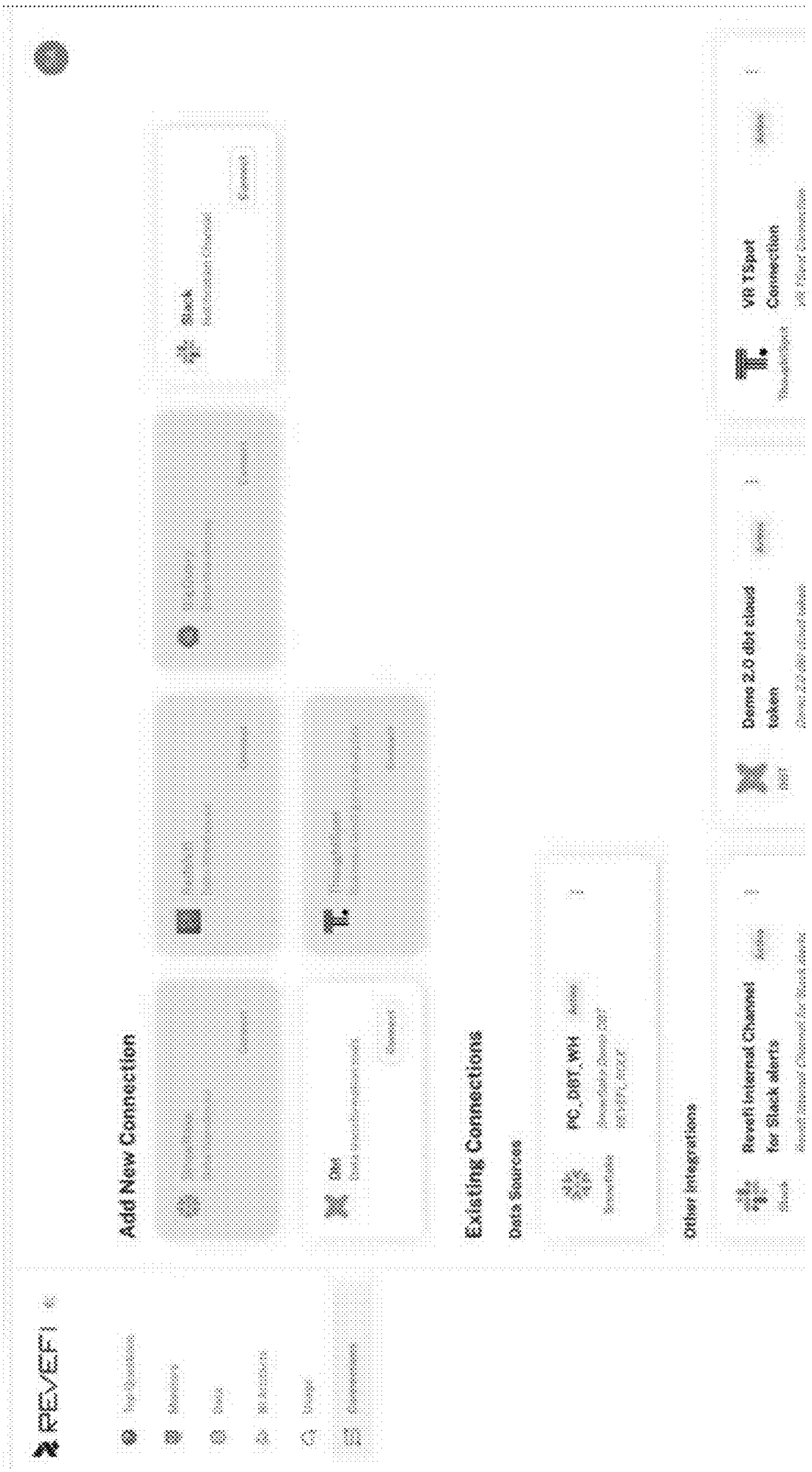
FIG. 5D is a screenshot of a user interface showing connections to tools that include data relating to nodes.

FIG. 5D is a screenshot of a user interface showing connections to tools that include data relating to nodes. Tools can be connected to the data observation platform using this user interface. Once a tool is connected, metadata from the tool can be collected and processed to generate quality metrics for tables utilized by the tool.

Figure 6:
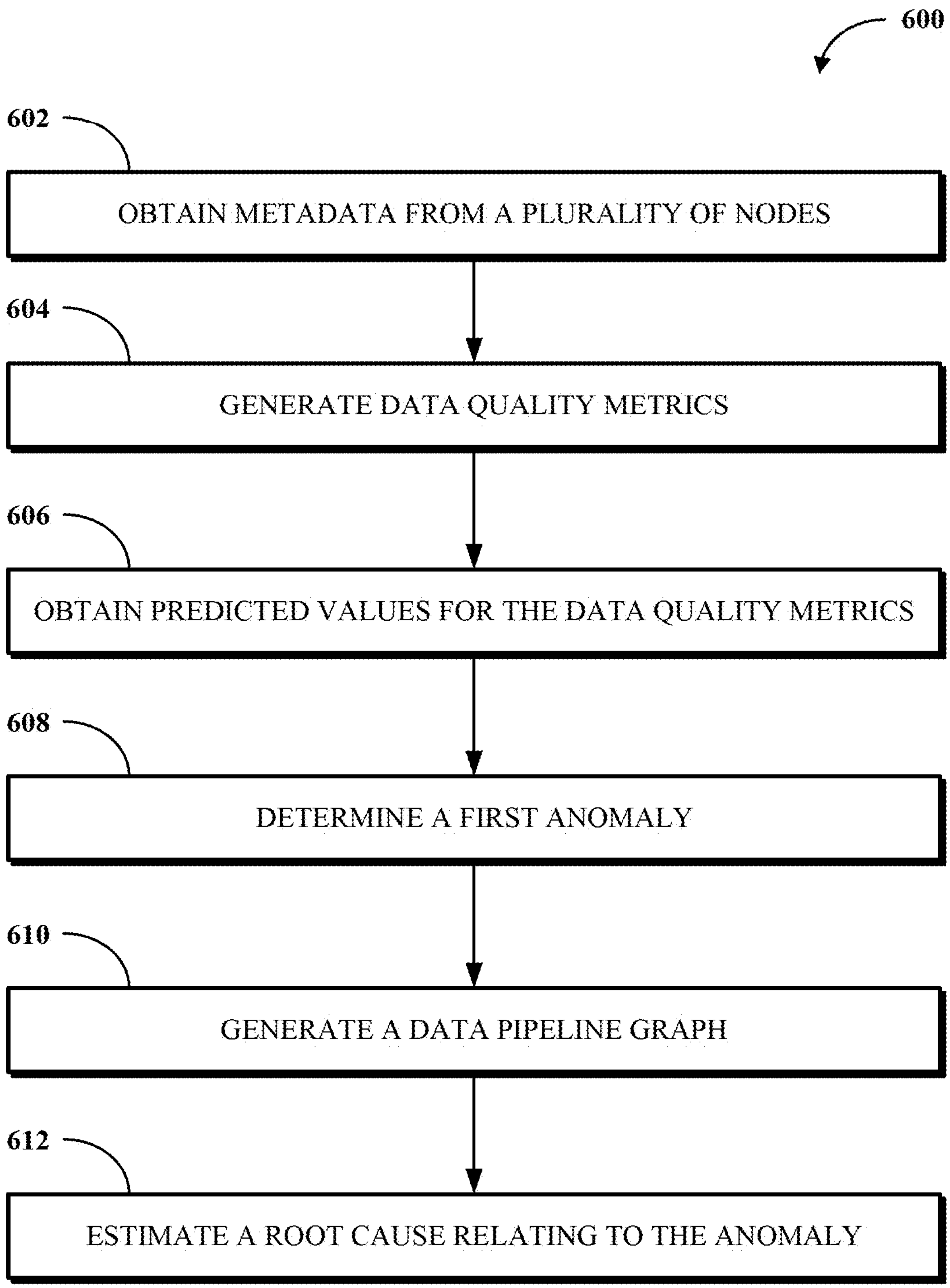
FIG. 6 is a flowchart of an example of a technique data observation.

FIG. 6 is a flowchart of an example of a technique 600 of data observation. For example, technique 600 may be performed by a data observation platform such as data observation platform 102 as described above with respect to FIG. 1. For example, technique 600 may be performed by one or more computing devices such as computing device 200 as described above with respect to FIG. 2. In some implementations, a non-transitory computer readable medium storing instructions may be provided and the instructions, when executed by a processor causes the processor to perform technique 600. Such computing devices include processor(s) and memory storing instructions that when executed cause the processor(s) to perform steps of technique 600.

At step 602, metadata is obtained from a plurality of nodes. For example, metadata relating to respective nodes of a plurality of nodes may be periodically obtained. For example, the metadata may be obtained from data sources (such as data sources 106). For example, DML statements may be executed to obtain the data. For example, logs may be parsed to obtain metadata. A node may for example be a table in a data warehouse or that is utilized by a tool that is connected to the data observation platform. The metadata may include information regarding table modification, number of rows inserted, number of bytes inserted, number of load commands, duration of load command processing, and total number of rows in table.

Depending on the metadata obtained, metadata may be cached or aggregated. Certain metadata may be cached for a period of time and then aggregated (for older data points).

At step 604 a data quality metric is generated using the metadata. For example, data quality metrics may be automatically generated for respective nodes of the plurality of nodes based on the obtained metadata. For example, a data quality metric can be freshness indicating when a table was last updated (e.g., a last modification metric). The freshness data quality metric may be automatically generated for a node based on an determination that the metadata has information indicating freshness. Other examples of data quality metrics have been previously described, such as a quantity of updates per time period metric (e.g., a number of incremental rows per hour, day, or week), a volume of data per time period metric (e.g., a number of number of bytes per hour, day, or week), and a node size metric (e.g., a total row count). Other data quality metrics that are indicative of a health or other status of a node may also be utilized. Data quality metrics may be generated based on availability of metadata relating to such data quality metrics, data quality metrics may be generated without reference to availability of metadata, or combinations thereof.

Generation of a data quality metric may include creating a data structure or database entry identifying or associating the data quality metric with a node. Generation of a data quality metric may also include creating respective time series data relating to respective data quality metrics based on the metadata and storing such time series data in a data structure or database associated with the respective data quality metric. The time series data may include measured values (e.g., obtained from the metadata) corresponding to respective ones of the data quality metrics. The time series data may be periodically updated as metadata is periodically obtained. Depending on the implementation or the data quality metric, time series data may be updated on or based on a time interval, based on a signal that updated metadata is available, based on an indication that metadata was not obtained as expected, or combinations thereof. In some implementations, time series data may be removed or compressed after a particular time period or number of time series data points.

In some implementations, data quality metrics may be automatically generated for all of the nodes associated with the data observation platform or a particular system, data source, or other category of nodes associated with the data observation platform. For example, a data warehouse may be connected to a data observation platform and all of the tables in the data warehouse may automatically have data quality metrics generated for them.

Data quality metrics may have different characteristics or categories of characteristics. For example, some data quality metrics may be event metrics and some may be accumulator metrics. Event metrics are indicative of an event occurring at or proximate to a given time (or data corresponding to such an event) and accumulator metrics indicate an increasing total value over time. Depending on the type of metric, measured values may be interpreted or predicted differently. For example, with respect to a last modified time (which may be an event metric), a measured value may be evaluated by calculating a difference between a measured value (modified time) and prior or later measured values (modified time) or a current time. For example, with respect to an event metric, an absence of a measured value may provide information that may be compared to a predicted value (e.g., in the case of a modified time, the time elapsed since the last measured value).

At step 606, the technique includes obtaining predicted values for the data quality metrics. For example, this may include obtaining predicted values for all of the data quality metrics automatically generated in step 604. For example, this may include executing a plurality of candidate machine learning models over time series data to generate candidate predicted values for respective ones of the data quality metrics. A plurality of candidate machine learning models may be selected from available candidate machine learning models, such as those previously described. For example, such candidate machine learning models may be designed to operate on time series data. Such models may be self-learning in nature based on the time-series data consumed.

The selection of candidate machine learning models for a data quality metric may be based on prior selections for that data quality metric.

Some or all of the candidate machine learning models may be designed to account for seasonality (for example where data points may have predictable variations over time, such as by day of the week, weekday vs. weekend, etc.). The candidate machine learning models may include, for example, ARIMA, SARIMA, LSTM, Random Cut Forest, statistical techniques such as z-score, or combinations thereof.

Predicted values may include a prediction of what the measured value is at a particular time, multiple predicted values indicating a prediction of a range in which the measured value is likely to be found, a confidence interval indicating a quantity above and a quantity below (which may be the same quantity or different quantities) within which the measured value is likely to be found, or combinations thereof.

Over time, as candidate machine learning models are executed over updated time series data, the number of candidate machine learning models selected may decrease. For example, a subset of the candidate machine learning models of the plurality of candidate machine learning models are removed over time by eliminating candidate machine learning models that are measured to have a higher error over time. In some implementations, the number of candidate machine learning models may be increased after a threshold period of time before being decreased again. For example, removed candidate machine learning models may be re-added to the plurality of candidate machine learning models after a reset time period has elapsed. In some implementations, there may be a minimum of three candidate machine learning models.

For example, step 606 may also include selecting a selected machine learning model from the plurality of candidate machine learning models for respective ones of the data quality metrics based on a comparison between at least some of the measured values and at least some of the predicted values. For example, a certain percentage or number of time series data points (such as 80%) may be utilized to train a candidate machine learning model and a certain percentage or number of time series data points (such as 20%) may be utilized to test a candidate machine learning model.

One or more of the time series data points for testing may be used to select a machine learning model from the candidate machine learning models. For example, a machine learning model having a difference between its predicted value and a measured value at a given time in the timer series that is less than the difference measured for other candidate machine learning models may be selected. Depending on the implementation, in addition or instead of using an absolute difference between a measured value and a predicted value, a range of a confidence interval may be used to select the machine learning model (e.g., a narrower confidence interval may be preferred). Depending on the implementation, comparisons between predicted and measured values over multiple time series data points may be utilized to perform the selection. Other variations of selection are possible.

For example, step 606 may also include obtaining the predicted values based on the selected machine learning model for respective ones of the data quality metrics. For example predicted values for time series data points may have already been calculated and may be obtained for the data quality metrics. In some situations or implementations, the selected machine learning model may be re-executed to obtain predicted values.

In some implementations, certain signals may be monitored, and actions taken to improve efficiency of the data observation platform. For example, a signal may include information indicative that a first node has been deleted and a second node has been created to replace the first node. In response to detecting that a first node has been deleted and a second node has been created to replace the first node, data quality metrics and time series data of the first node may be associated with the second node.

For example, a signal may include information indicative that a first node has not been updated for a time period longer than a threshold. In response to detecting that the first node has not been updated for the time period exceeding a time period threshold, obtaining predicted values for data quality metrics associated with the first node may be suspended. This may permit a reduction in compute, memory, power and/or other resource consumption by avoiding the execution of machine learning models where no new data is available for those machine learning models.

At step 608, a first anomaly is determined. For example, a first anomaly relating to a first one of the data quality metrics for a first node of the plurality of nodes may be determined including by comparing a first measured value at a first time relating to the first one of the data quality metrics and a first predicted value at the first time relating to the first one of the data quality metrics. For example the selected model may generate a predicted value and a confidence interval. If a measured value associated with the predicted value is outside of the range of the confidence interval, an anomaly is detected. For example, the selected model may generate predicted values including upper and lower bounds for the metric on a per measured value basis in the time series data. The measured value for the data quality metric is compared to the upper and lower bounds. If the measured value for the data quality metric is outside of the bounds an anomaly is detected.

The anomaly can be displayed to a user in a user interface (e.g., see FIGS. 5A, B) (e.g., by transmitting information to a client device for display) or can be utilized to remediate the anomaly—e.g., by fixing an existing data pipeline or by changing the data pipeline to prevent future occurrences of the anomaly.

At step 610, a data pipeline graph is generated. For example, a data pipeline graph corresponding to the at least some of the plurality of nodes including the first node may be generated by parsing logs including information relating to usage of at least some of the plurality of nodes to identify relationships between at least some of the plurality of nodes. For example, the logs may be query logs including queries executed by the data warehouse system. The data pipeline graph can be generated in an automated manner based on data history and how data flows between nodes. For example a data markup language (DML) parser can interpret DML stored in a query log to determine how nodes are connected by way of inputs and outputs. For example, if a query includes selecting data from a first table and inserting that data into a second table, that may be determined to indicate that data is flowing from the first table to the second table. Accordingly, a directional edge from a first table to a second table may be created in the graph based on an identification of a pattern of inserts into the second table based on data selected from the first table.

The data pipeline graph may also include information indicative of an importance of the directional edge based on the pattern of inserts. For example, the information indicative of the importance may include or be based on a number of queries that transfer data from a first table to a second table, a number of rows or size of data transferred, or combinations thereof.

The data pipeline graph may also include information indicative of an identity of users or a frequency of users accessing nodes in the data pipeline graph. Such information may also provide information indicative of an importance of a directional edge.

At step 612, a root cause relating to the anomaly is estimated. For example, a root cause relating to the first anomaly may be estimated by traversing the data pipeline graph from the first node. For example, starting from the first node, edges connecting to the first node may be traversed in a direction opposite that of the direction of the edges (e.g., so that edges indicating that data is being provided to the first node are traversed). The nodes connected to the other side of such edges are examined to determine whether an anomaly is found with respect to those nodes. The process of traversing edges may be repeated until such time that no nodes are found with an anomaly. The root cause can be estimated as being the node for which the last anomaly in a traversed set of edges and nodes is found. In situations where there are multiple traversed set of edges having anomalies, a root cause anomaly may be estimated from each set or may be estimated from less than all of the sets (e.g., from the set having a greater number of nodes, greater importance, or some combination thereof).

In some implementations, estimating the root cause may include comparing information indicative of the importance associated with traversed directional edge(s) to a threshold. For example, a priority of the estimated root cause may be determined based on information indicative of the importance of directional edges between a second node associated with the root cause and the first node. In some implementations, the priority is further determined based on an identity of users accessing the first node, second node, or nodes between the first node and second node and a frequency of users accessing the first node, second node, or nodes between the first node and second node.

The estimated root cause can be displayed to a user in a user interface (e.g., see FIG. 5C) (e.g., by transmitting information to a client device for display) or can be utilized to remediate the anomaly—e.g., by fixing an existing data pipeline or by changing the data pipeline to prevent future occurrences of the anomaly. In some implementations, the display of information may be based on the priority of the estimated root cause. For example, an estimated root cause with a lower priority may not be displayed or may be displayed with less prominence. For example, an estimated root cause with a higher priority may be displayed with greater prominence.

Implementations of this disclosure can also detect data pipelines or nodes in disuse. For example, the quality metrics may indicate that nodes in a data pipeline are not being updated or not being accessed. If such a condition persists for a given period (e.g., is below a certain threshold of utilization or updating) then the nodes in the data pipeline may be recommended for deletion or archiving (or such steps may be performed automatically).

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, Ruby, assembler, or the like, with the various algorithms being implemented with a combination of data structures, objects, processes, routines, or other programming elements.

Functional aspects can be implemented in algorithms that execute on one or more processors. Furthermore, the implementations of the systems, methods, and techniques disclosed herein could employ a number of conventional techniques for electronics configuration, signal processing or control, data processing, and the like. The words "mechanism" and "component" are used broadly and are not limited to hardware, mechanical or physical implementations, but can include software routines implemented in conjunction with hardware processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An automated data observation system, comprising a processor and a memory storing instructions that when executed by the processor cause the processor to:

periodically obtain metadata relating to respective nodes of a plurality of nodes;

automatically generate data quality metrics for respective nodes of the plurality of nodes based on the metadata;

obtain predicted values for the data quality metrics including by:

executing a plurality of candidate machine learning models over time series data including measured values corresponding to respective ones of the data quality metrics to generate candidate predicted values for respective ones of the data quality metrics, selecting a selected machine learning model from the plurality of candidate machine learning models for respective ones of the data quality metrics based on a comparison between at least some of the measured values and at least some of the predicted values, and obtaining the predicted values based on the selected machine learning model for respective ones of the data quality metrics;

determine a first anomaly relating to a first one of the data quality metrics for a first node of the plurality of nodes including by comparing a first measured value at a first time relating to the first one of the data quality metrics and a first predicted value at the first time relating to the first one of the data quality metrics;

generate a data pipeline graph corresponding to the at least some of the plurality of nodes including the first node by parsing logs including information relating to usage of at least some of the plurality of nodes to identify relationships between at least some of the plurality of nodes, including creating a directional edge from a first table to a second table based on an identification of a pattern of inserts into the second table based on data selected from the first table, wherein the data pipeline graph includes information indicative of an importance of the directional edge based on the pattern of inserts;

estimate a root cause relating to the first anomaly by traversing the data pipeline graph from the first node;

determine a priority of the estimated root cause based on information indicative of the importance of directional edges between a second node associated with the root cause and the first node, wherein the priority is further determined based on an identity of users accessing the first node, second node, or nodes between the first node and second node and a frequency of users accessing the first node, second node, or nodes between the first node and second node; and transmit, to a client device, information relating to the estimated root cause for display by the client device based on the priority, wherein the nodes of the plurality of nodes are tables in a data warehouse system, the logs are query logs including queries executed by the data warehouse system.

2. The system of claim 1, wherein the plurality of nodes includes all tables in a data warehouse system, data quality metrics are generated for all of the plurality of nodes, and predicted values are obtained for all of the data quality metrics.

3. The system of claim 1, wherein the instructions to estimate the root cause includes comparing the information indicative of the importance to a threshold.

4. The system of claim 1, wherein the memory further comprises instructions that when executed by the processor cause the processor to:

detect that the first node has been deleted and that a second node has been created to replace the first node; and in response to the detection, associate data quality metrics and time series data of the first node with the second node.

5. The system of claim 1, wherein the memory further comprises instructions that when executed by the processor cause the processor to:

detect that the first node has not been updated for a time period exceeding a time period threshold; and based on the detection, suspend obtaining predicted values for data quality metrics associated with the first node.

6. The system of claim 1, wherein the data quality metrics include a last modification metric, a quantity of updates per time period metric, a volume of data per time period metric, and a node size metric.

7. The system of claim 1, wherein a subset of the candidate machine learning models of the plurality of candidate machine learning models are removed over time by eliminating candidate machine learning models that are measured to have a higher error over time.

8. The system of claim 7, wherein the plurality of candidate machine learning models includes a minimum of three candidate machine learning models.

9. The system of claim 7, wherein, after a reset time period has elapsed, candidate machine learning models are re-added to the plurality of candidate machine learning models.

10. A method comprising:

periodically obtaining metadata relating to respective nodes of a plurality of nodes;

automatically generating data quality metrics for respective nodes of the plurality of nodes based on the metadata;

obtaining predicted values for the data quality metrics including by:

executing a plurality of candidate machine learning models over time series data including measured values corresponding to respective ones of the data quality metrics to generate candidate predicted values for respective ones of the data quality metrics, selecting a selected machine learning model from the plurality of candidate machine learning models for respective ones of the data quality metrics based on a comparison between at least some of the measured values and at least some of the predicted values, and obtaining the predicted values based on the selected machine learning model for respective ones of the data quality metrics;

determining a first anomaly relating to a first one of the data quality metrics for a first node of the plurality of nodes including by comparing a first measured value at a first time relating to the first one of the data quality metrics and a first predicted value at the first time relating to the first one of the data quality metrics;

generating a data pipeline graph corresponding to the at least some of the plurality of nodes including the first node by parsing logs including information relating to usage of at least some of the plurality of nodes to identify relationships between at least some of the plurality of nodes, including creating a directional edge from a first table to a second table based on an identification of a pattern of inserts into the second table based on data selected from the first table, wherein the data pipeline graph includes information indicative of an importance of the directional edge based on the pattern of inserts;

estimating a root cause relating to the first anomaly by traversing the data pipeline graph from the first node;

determining a priority of the estimated root cause based on information indicative of the importance of directional edges between a second node associated with the root cause and the first node, wherein the priority is further determined based on an identity of users accessing the first node, second node, or nodes between the first node and second node and a frequency of users accessing the first node, second node, or nodes between the first node and second node; and transmitting information relating to the relating to the estimated root cause to a client device for display on the client device based on the priority, wherein the nodes of the plurality of nodes are tables in a data warehouse system, the logs are query logs including queries executed by the data warehouse system.

11. The method of claim 10, further comprising:

generating a data pipeline graph corresponding to at least some of the plurality of nodes by parsing logs including information relating to usage of at least some of the plurality of nodes to identify relationships between at least some of the plurality of nodes; and estimating a root cause relating to the first anomaly by traversing the data pipeline graph from the first node.

12. The method of claim 11, wherein candidate machine learning models are removed from the plurality of candidate machine learning models over time provided that the plurality of candidate machine learning models includes at least three candidate machine learning models, and wherein removed candidate machine learning models are periodically re-added to the plurality of candidate machine learning models.

13. The method of claim 12, wherein the data quality metrics include a last modification metric, a quantity of updates per time period metric, a volume of data per time period metric, and a node size metric, and obtaining predicted values for the data quality metrics relating to the first node is suspended based on a determination that measured values relating to the last modification metric indicates that the first node has not been modified for a time period exceeding a time period threshold.

14. A non-transitory computer readable medium storing instructions that when executed by a processor cause the processor to:

periodically obtain metadata relating to respective nodes of a plurality of nodes;

automatically generate data quality metrics for respective nodes of the plurality of nodes based on the metadata;

obtain predicted values for the data quality metrics including by:

executing a plurality of candidate machine learning models over time series data including measured values corresponding to respective ones of the data quality metrics to generate candidate predicted values for respective ones of the data quality metrics, selecting a selected machine learning model from the plurality of candidate machine learning models for respective ones of the data quality metrics based on a comparison between at least some of the measured values and at least some of the predicted values, and obtaining the predicted values based on the selected machine learning model for respective ones of the data quality metrics;

determine a first anomaly relating to a first one of the data quality metrics for a first node of the plurality of nodes including by comparing a first measured value at a first time relating to the first one of the data quality metrics and a first predicted value at the first time relating to the first one of the data quality metrics;

generate a data pipeline graph corresponding to at least some of the plurality of nodes by parsing logs including information relating to usage of at least some of the plurality of nodes to identify relationships between at least some of the plurality of nodes, including creating a directional edge from a first table to a second table based on an identification of a pattern of inserts into the second table based on data selected from the first table, wherein the data pipeline graph includes information indicative of an importance of the directional edge based on the pattern of inserts;

estimate a root cause relating to the first anomaly by traversing the data pipeline graph from the first node;

determine a priority of the estimated root cause based on information indicative of the importance of directional edges between a second node associated with the root cause and the first node, wherein the priority is further determined based on an identity of users accessing the first node, second node, or nodes between the first node and second node and a frequency of users accessing the first node, second node, or nodes between the first node and second node; and transmit, to a client device, information relating to the estimated root cause for display by the client device based on the priority, wherein the nodes of the plurality of nodes are tables in a data warehouse system, the logs are query logs including queries executed by the data warehouse system.

15. The non-transitory computer readable medium of claim 14, wherein an importance of the estimated root cause is determined based on the information indicative of importance of the nodes and edges traversed when estimating the root cause.

* * * * *